_United States Patent_ [19]

Brenner

[11] 4,118,359

[45] Oct. 3, 1978

[54] PLASTICIZATION OF NEUTRALIZED SULFONATED ELASTOMERIC POLYMER

[75] Inventor: Douglas Brenner, Livingston, N.J.

[73] Assignee: Exxon Research & Engineering Co., Linden, N.J.

[21] Appl. No.: 855,693

[22] Filed: Nov. 29, 1977

[51] Int. Cl.$^2$ ................................................ C08K 5/36
[52] U.S. Cl. ........................ 260/30.8 R; 260/32.6 A
[58] Field of Search ................. 260/79.3 R, 32.6 A, 260/32.4, 30.8 R

[56] References Cited
U.S. PATENT DOCUMENTS 3,847,854 11/1974 Canter et al. .................. 260/23.7 M
4,014,847 3/1977 Lundberg et al. .............. 260/33.4 R Primary Examiner—Lewis T. Jacobs
Attorney, Agent, or Firm—Richard E. Nanfeldt

[57] ABSTRACT

This invention relates to an improved elastomeric composition of metal and ammonium neutralized sulfonated elastomeric polymers which are preferentially plasticized with an organic urea or organic thiourea at a minimum critical concentration level of at least 5 parts by weight based on 100 parts by weight of the metal neutralized elastomeric polymer, wherein the plasticized compositions have an improved balance of physical and rheological properties. These elastomeric compositions can be readily processed due to their superior rheological properties on conventional plastic fabrication equipment.

10 Claims, No Drawings

PLASTICIZATION OF NEUTRALIZED SULFONATED ELASTOMERIC POLYMER

BACKGROUN OF THE INVENTION

1. Field of the Invention

This invention relates to an improved elastomeric composition and metal and ammonium neutralized sulfonated elastomeric polymers which are preferentially plasticized with an organic urea or organic thiourea at a minimum critical concentration level of at least 5 parts by weight based on 100 parts by weight of the metal neutralized elastomeric polymer, wherein the plasticized compositions have an improved balance of physical and rheological properties. These elastomeric compositions can be readily processed due to their superior rheological properties on conventional plastic fabrication equipment.

2. Description of the Prior Art

Recently a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728 herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The $SO_3H$ groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VIB, VIIB and VIII and mixtures thereof of the Periodic Tables of Elements. Although these sulfonated elastomeric polymers prepared by the process of U.S. Pat. No. 3,642,728 are readily useable in a certain number of limited applications, they are not as readily adaptable for the manufacture of an injection moldable elastomeric article such as footwear as are the improved compositions of the present invention, wherein an improved balance of physical and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved physical and rheological properties of the compositions of the present invention.

U.S Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° C. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonate groups at a temperature of forming. The compositions of this patent are based on plastic backbones, where the compositions of the present invention are based on elastomeric backbones. The compositions formed by the process of U.S. Pat. No. 3,870,841 are not as suitable for the manufacture of high performance elastomeric articles such as elastomeric tubing formed by an extrusion process as are the compositions of the present invention.

U.S. Pat. No. 3,847,854, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. However, the plasticizers falling within this criterion exhibit a very large range in plasticizing effectiveness, so this criterion gives no help in choosing which chemicals will be most effective in improving processability of the sulfonated polymer.

The concentrations of the non-volatile plasticizers are limited to an upper concentration of 6–7 parts by weight because with the metal neutralized sulfonated elastomers of this invention, there would be an adverse plasticization of the polymeric backbone. This invention fails to teach, imply or infer the use of an organic urea or organic thiourea as a preferential plasticizer at high concentrations. The inventive concept of the present instant invention clearly teaches the use of organic ureas or thioureas as a preferential plasticizer at a minimum concentration level of at least about 5 parts per hundred by weight in order to achieve an improved balance of rheological and physical properties.

SUMMARY OF THE INVENTION

The present invention relates to improved compositions of metal neutralized sulfonated elastomeric polymers being preferentially plasticized with about 5 to about 75 parts by weight of an organic urea or organic thiourea based on 100 parts by weight of the metal neutralized EPDM terpolymer, more preferably about 8 to about 40 and most preferably about 10 to about 30. These improved compositions exhibit a spectrum of physical and rheological properties previously simultaneously unattainable by the teachings of the prior art. The compositions of the present invention are readily processed due to their superior rheological properties on conventional plastic fabrication equipment such as extruders into high performance elastomeric articles such as elastomeric hose.

Accordingly, it is an object of our present instant invention to provide unique and novel compositions of metal and ammonium neutralized sulfonated elastomeric polymers being preferentially plasticized with an organic urea or an organic thiourea thereby providing high performance elastomeric articles which can be formed on conventional plastic fabricating equipment, wherein the compositions can be optionally modified with fillers, extender oils, waxes or polyolefinic thermoplastics and mixtures thereof.

GENERAL DESCRIPTION

This present invention relates to unique and novel elastomeric compositions of a metal neutralized sulfonated elastomeric polymer being preferentially plasticized with an organic urea or thiourea wherein the compositions exhibit not only a substantial improvement in flow properties but unexpected and substantial improvements in physical properties. Thus, essentially intractable sulfonated polymer can be made to process readily in conventional molding or extrusion operations.

The metal and ammonium neutralized sulfonated elastomeric polymers of this present instant invention are derived from unsaturated polymers which include low unsaturated elastomeric polymers such as Butyl rubber, or EPDM terpolymers.

The expression "Butyl rubber" as employed in the specification and claims is intended to include copolymers made from a polymerization reaction mixture having therein from 70 to 95.5% by weight of an isoolefin which has about 4 to 7 carbon atoms, e.g. isobutylene and about 0.5 to 30% by weight of a conjugated multiolefin having from about 4 to 14 carbon atoms, e.g. isoprene. The resulting copolymer contains 85 to 99.8% by weight of combined isoolefin and 0.2 to 15% of combined multiolefin.

Butyl rubber generally has a Staudinger molecular weight of about 20,000 to about 500,000, preferably about 25,000 to about 400,000 especially about 100,000 to about 400,000 and a Wijs Iodine No. of about 0.5 to 50, preferably 1 to 15. The preparation of Butyl rubber is described in U.S. Pat. No. 2,356,128 which is incorporated herein by reference.

For the purposes of this invention, the Butyl rubber may have incorporated therein from about 0.2 to 10% of combined multiolefin; preferably about 0.5 to about 6%; more preferably about 1 to about 4%, e.g. 2%.

Illustrative of such a Butyl rubber is Exxon Butyl 365 (Exxon Chemical Co.), having a mole percent unsaturation of about 2.0% and a Mooney viscosity (ML, 1 + 8, 212° F.) of about 40–50.

Low molecular weight Butyl rubbers, i.e. Butyl rubbers having a viscosity average molecular weight of about 5,000 to 85,000 and a mole percent unsaturation of about 1 to about 5% may be sulfonated to produce the polymers useful in this invention. Preferably, these polymers have a viscosity average molecular weight of about 25,000 to about 60,000.

The EPDM terpolymers are low unsaturated polymers having about 1 to about 10.0 wt.% olefinic unsaturation, more preferably about 2 to about 8, most preferably about 3 to 7 defined according to the definition as found in ASTM-D-1418-64 and is intended to mean terpolymers containing ethylene and propylene in the backbone and a diene in the side chain. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 80 wt.% ethylene and about 1 to about 10 wt.% of a diene monomer, the balance of the polymer being propylene. Preferably, the polymer contains about 45 to about 75 wt.% ethylene, e.g. 50 wt.% and about 2.6 to about 8.0 wt.% diene monomer, e.g. 5.0 wt.%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.) a terpolymer having a Mooney viscosity (ML, 1 + 8, 212° F.) of about 50 and having an ethylene content of about 50 wt.% and a 5-ethylidene-2-norbornene content of about 5.0 wt.%. The Mn of Vistalon 2504 is about 47,000, the Mv is about 145,000 and the Mw is about 174,000.

Another EPDM terpolymer Vistalon 2504–20 is derived from V-2504 (Exxon Chemical Co.) by a controlled extrusion process, wherein the resultant Mooney viscosity at 212° F. is about 20. The Mn of Vistalon 2504–20 is about 26,000, the Mv is about 90,000 and the Mw is about 125,000.

Nordel 1320 (DuPont) is another terpolymer having a Mooney viscosity at 212° F. of about 25 and having about 53 wt.% of ethylene, about 3.5 wt.% of 1,4-hexadiene, and about 43.5 wt.% of propylene.

The EPDM terpolymers of this invention have a number average molecular weight (Mn) of about 10,000 to about 200,000, more preferably of about 15,000 to about 100,000, most preferably of about 20,000 to about 60,000. The Mooney viscosity (ML, 1 + 8, 212° F.) of the EPDM terpolymer is about 5 to about 60, more preferably about 10 to about 50, and most preferably about 15 to about 40. The Mv of the EPDM terpolymer is preferably below about 350,000 and more preferably below about 500,000 and more preferably below about 350,000.

One means for carrying out the invention, is to dissolve the elastomeric polymer in a non-reactive solvent such as a chlorinated aliphatic hydrocarbon, chlorinated aromatic hydrocarbon, an aromatic hydrocarbon, or an aliphatic hydrocarbon such as carbon tetrachloride, dichloroethane, chlorobenzene, toluene, cyclohexane, pentane, isopentane, hexane, isohexane, or heptane. The preferred solvents are the lower boiling aliphatic hydrocarbons. A sulfonating agent is added to the solution of the elastomeric polymer and nonreactive solvent at a temperature of about $-10°$ C. to about 100° C. for a period of time of about 1 to about 60 minutes, more preferably at room temperature from about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorous. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophenol, or triethylphosphate. The most preferred sulfonation agent for the invention is an acyl sulfate selected from the group consisting essentially of benzoyl, acetyl, propionyl or butyrl sulfate. The acyl sulfate can be formed in situ in the reaction medium in a chlorinated aliphatic or aromatic hydrocarbon.

It should be pointed out that neither the sulfonating agent nor the manner of sulfonation is critical, provided that the sulfonating method does not degrade the polymer backbone. The reaction is quenched with an aliphatic alcohol such as methanol, ethanol, isopropanol, with an aromatic hydroxyl compound, such as phenol, a cyclo aliphatic alcohol such as a cyclohexanol or with water. The acid form of the sulfonated elastomeric polymer has about 10 to about 60 meq SO₃H groups per 100 grams of sulfonated polymer, more preferably about 15 to about 50; and most preferably about 20 to about 40. The meq of SO₃H/100 grams of polymer is determined by both titration of the polymeric sulfonic acid and Dietert Sulfur analysis. In the titration of the sulfonic acid the polymer is dissolved in a solvent consisting of 95 parts of toluene and 5 parts of methanol at a concentration level of 50 grams per liter of solvent. The acid form is titrated with ethanolic sodium hydroxide to an Alizarin-Thymolpthalein endpoint.

Neutralization of the acid form of the sulfonated elastomeric polymer is done, for example, by the addition of a solution of neutralizing agent such as a metal acetate or ammonium bases or amines such as ammonium acetate to the acid form of the sulfonated elastomeric polymer dissolved in the mixture of the aliphatic alcohol and non-reactive solvent. The metal acetate is dissolved in a binary solvent system consisting of water and/or an aliphatic alcohol. Typically, but non-limiting metal acetates are sodium acetate, ammonium acetate, barium acetate, magnesium acetate, aluminum acetate, potassium acetate, lead acetate, and zinc acetate, wherein zinc acetate is preferred. Typical amines are the simpler lower molecular weight amines such as methylamine, ethylamine, butylamine, dimethylamine, trimethylamine, cyclohexylamine, piperidine and aniline.

Sufficient neutralizing agent is added to the solution of the acid form of the elastomeric polymer to effect neutralization of the SO₃H groups. It is preferable to neutralize at least 95% of the acid groups, more preferably about 98%, most preferably 100%. Metal oxides and hydroxides such as ZnO and Mg(OH)₂ can also be employed to effect the neutralization of the SO₃H groups.

The resultant neutralized sulfonated terpolymer has a melt viscosity which is dependent upon the molecular weight of the base polymer, the level of sulfonation, and the associated cation. An EPDM with an original Mooney viscosity (ML, 1 + 8, 212° F.) of about 55, containing about 40 meq. sulfonate/100g EPDM and possessing cations such as mercury, magnesium, calcium, cobalt, lithium, barium, sodium and the like may crumble upon existing from a capillary rheometer at 220° C. at a shear rate of 0.73 sec⁻¹ and will possess an apparent viscosity in excess of 5 × 10⁶ poise. An EPDM with an original Mooney viscosity (ML, 1 + 8, 212° F.) of about 20, containing about 30 meq. sulfonate/100g EPDM, and possessing cations such as zinc, lead, and ammonium possess apparent viscosities of from about 10⁶ to about 10 × 10⁶ poise at a shear rate of 0.73 sec⁻¹ at 200° C. Lower sulfonate contents with amine salts result in apparent viscosities below 1 × 10⁶ poise under the same testing conditions.

On the other hand the physical properties of the unplasticized sulfonated and neutralized elastomers improve with increasing sulfonate content. Further, metallic cations provide better physical properties than the ammonium or amine cations. Good development of physical properties usually start to occur when about 20 meq. sulfonate/100g polymer are present, and the physical properties obtained at 30 meq. sulfonate/100g polymer and higher are preferred. However, even at these higher levels of sulfonate the unplasticized neutralized sulfonated elastomers still possess relatively modest physical properties, and the melt viscosities are so high that mixing or processing these gums in the absence of a plasticizer on conventional equipment is extremely difficult if not impossible.

U.S. Pat. No. 3,847,854 addressed itself to the problem of melt processability in metal sulfonate containing elastomers and a large number of materials are claimed as plasticizers that would give the ionomers lower melt viscosities at processing temperatures and thereby permit melt fabrication. However, many of the materials included are relatively poor flow improvers.

U.S. Pat. No. 3,847,854 teaches that the effective flow improvers have an adverse effect on physical properties and therefore directs that no more than 6-7 wt.% of a nonvolatile plasticizer be used above which improvements in melt flow was taught to be associated with a loss in physical properties.

The melt viscosities of the systems investigated herein were determined through the use of a standard melt index apparatus at 190° C., and generally at 250 psi. Materials possesing a melt index under these conditions of very roughly 0.2 g/10 min or greater can be considered mixable with plasticizers, fillers, extender oils, and other additives in high intensity, high shear rate mixers.

It has been found that among a large number of nonvolatile functional organic compounds that organic ureas or organic thioureas provide for an excellent balance of markedly improved flow properties and at the same time good physical properties. Contrary to the teachings of U.S. Pat. No. 3,847,854 these ureas or thioureas can be used at concentrations far beyond 6-7 parts by weight of urea or thiourea/100 polymer.

Useful organic urea or thiourea for the practice of this invention are those with the general structure

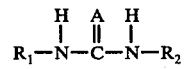

wherein A is selected from the group consisting of oxygen or sulfur, and R₁ and R₂ which can be the same or different are selected from the group consisting of aralkyl groups such as benzyl, aryl groups such as phenyl or tolyl, or alkyl groups such as octadecyl. In the case that both R₁ and R₂ are alkyl groups, at least one of them must be a C₁₂ to C₂₂ alkyl, more preferably C₁₆ to C₂₂ alkyl, and most preferably C₁₈ to C₂₂ alkyl and mixtures thereof. A preferred urea plasticizer is dibenzyl urea and preferred thioureas are 1,3 didodecyl-2-thiourea, and N,N' di-P-tolylthiourea.

In order to exhibit the substantial improvements in the balance of melt processability and physical properties the organic urea or thiourea must at least be solid at room temperature and preferably possess melting points of 50° C. and higher, most preferably 70° C. or higher.

In order to achieve an enhanced balance of good melt flow combined with satisfactory physical properties it is important to incorporate the organic urea or thiourea into the neutralized sulfonated elastomer at about 5 to about 75 parts by weight per hundred of the sulfonated polymer, more preferably at about 5 to about 50, and most preferably at about 8 to about 30.

Improvements in flow while maintaining satisfactory physical properties are obtainable with a variety of cations. Of the many useful cations Zn, Pb, Ba, Ca, K, Mg and Na are preferred. Most preferred is the Zn sulfonate which provides organic urea or thiourea plasticized gums with good physical properties and ready melt processability.

The organic urea or thiourea can be incorporated into the unplasticized gums in a number of ways. One means is the addition of the urea or thiourea to the cement of the sulfonated and neutralized polymer prior to its isolation during the manufacturing process. The resultant plasticized polymer can still have sufficiently high viscosity and integrity at the usual temperatures of drying so that it could be easily and conveniently dried in a tumble dryer or fluid bed dryer with hot air at for example 100° C. Yet the plasticized polymer can be made to possess sufficiently low viscosity so that it may be dewatered and dried in a dewatering extruder.

Organic urea or thiourea plasticizers can also be added to the gums through the solution of already isolated and dried unplasticized gums and the addition of the plasticizer to this solution. The resultant blend is isolated in the usual manner. Alternatively in cases where the unplasticized gums do not possess too high of a viscosity, it is possible to flux the gum and the organic urea or thiourea in high intensity high shear mixers such as Banbury mixers and Farrell continuous mixers.

DESCRIPTION OF THE PREFERRED EMBODIMENTS

EXAMPLE 1 — PREPARATION OF A NEUTRALIZED LIGHTLY SULFONATED POLYMER

An EPDM was used as the backbone elastomeric polymer. It had a composition of about 52 wt.% ethylene, 43 wt.% propylene and 5 wt.% of 5-ethylidene-2-norbornene, and it had a Mooney viscosity ML at 100° C. (1+8 min.) of about 20. This base polymer was lightly sulfonated using acetyl sulfate in accordance with the method disclosed in U.S. Pat. No. 3,836,511 to a sulfonate level of about 32 meq. per 100g of base polymer. The acid form of this lightly sulfonated elastomer was neutralized in solution by the addition of excess zinc acetate at a concentration of about 60 meq. per 100g of polymer. This material was steam stripped and then dried in a fluidized bed hot air drier. This material was utilized for the preparation of some of the samples which are described in the following examples. This zinc neutralized lightly sulfonated EPDM was quite tough even at elevated temperatures, and it was too intractable to be fabricated by rapid polymer processing techniques such as extrusion or injection molding.

EXAMPLE 2 — MELT INCORPORATION OF OCTADECYLUREA INTO A NEUTRALIZED LIGHTLY SULFONATED POLYMER 45.5g of the neutralized lightly sulfonated polymer in crumb form prepared in Example 1 was briefly mixed in a beaker with a spatula with 8.5g of octadecylurea (Eastman Chemical Co.). This was a concentration of 60 meq. of octadecylurea per 100g of gum, or 15.7 wt.% additive. This blend was added to a Brabender Plasticorder having 60 cc mixing head with Banbury mixers. The material was mixed at 160° C. and 50 RPM. Very rapidly the materials fused into a coherent melt which mixed very well in the mixing head and resulted in excellent dispersion of the additive. Six minutes after the addition of the blend to the mixer had been completed, mixing was terminated. Then the material was sheeted out by a single pass through a two-roll mill having a 0.040 inch roll separation.

EXAMPLE 3 — PREPARATION OF TEST SAMPLES, AND MEASUREMENT OF FLOW AND TENSILE PROPERTIES OF A LIGHTLY SULFONATED EPDM PLASTICIZED WITH VARIOUS SUBSTITUTED UREAS AT HIGH CONCENTRATIONS

Various substituted ureas were incorporated into samples of the neutralized sulfonated EPDM described in Example 1, using procedures similar to those described in Example 2. Excellent, homogeneous materials were obtained in each case. Test pads were made from each of these samples by compression molding at 350° F. The procedure was to preheat the empty mold plates in the press for a few minutes, then the material was put in the mold and the mold containing the material was preheated in the press with the mold plates slightly open for two minutes. Then the mold plates were pressed closed under a force of about 20 tons for two minutes. The samples were cooled in the molds under pressure for two minutes. Microtensile pads having a thickness of about 0.6 mm and test regions measuring 2.54 mm in width and 12.7 mm in length were cut from the test pads with a die. The samples were stored in closed dry bottles for one or more days prior to tensile testing.

Tensile strengths of the samples were measured with an Instron TM table model instrument, using a pulling speed of 51 mm per minute. Measurements were made at room temperature (25° C.), and also at a higher temperature to determine the usefulness of the materials at elevated temperature. In the measurements at elevated temperature, after being placed in the testing oven, a three minute waiting period was allowed before pulling to enable the sample to equilibrate with the oven temperature. The elevated temperature utilized in most measurements was 70° C.

Melt flow rates for the various materials were determined at 190° C. which is in the range of typical processing temperatures for lightly sulfonated EPDM. The melt index instrument specified in ASTM 1238-70 was used, with the standard capillary. The weight of the probe plus the added weight was 12.5 kilograms. Flow rates were measured electronically as probe displacement per minute, and these results were converted to grams per 10 minutes using a conversion factor.

The melt flow rates and tensile properties for the lightly sulfonated EPDM samples plasticized with various substituted ureas at high concentrations are shown in Table 1; properties of the non-plasticized lightly sulfonated EPDM gum are also shown in Table 1 for reference.

This example shows that a lightly sulfonated EPDM material plasticized with high concentrations of various substituted ureas resulted in tremendously improved melt flow rates, as compared with the non-plasticized material, for much better processability at fabrication temperatures. In addition, it can be seen from Table I that the tensile strengths are well above that of the non-plasticized gum. Therefore, it is clear that high concentrations of various substituted ureas can give a very desirable balance of good tensile properties combined with excellent melt flow at processing temperatures.

TABLE I

TENSILE AND MELT FLOW PROPERTIES OF A SULFONATED EPDM PLASTICIZED WITH VARIOUS SUBSTITUTED UREAS AT HIGH CONCENTRATIONS

| Additive | Concentration (meq/100g Gum) | Wt. % | Melt Flow Rate[1] (g/10 min) | Tensile Properties[2] 25° C Strength (psi) | Elong. (%) | Initial Modulus[3] (psi) | 70° C Strength (psi) | Elong. (%) | Initial Modulus (psi) |
|---|---|---|---|---|---|---|---|---|---|
| dodecylurea | 60 | 12.0 | 1.2 | 900 | 570 | 405 | 65 | 770 | 200 |
| octadecylurea | 60 | 15.7 | 1.5 | 1950 | 505 | 645 | 80 | 845 | 210 |
| N,N' dimethyl carbanilide | 60 | 12.6 | 1.1 | 1500 | 465 | 655 | 95 | 800 | 245 |
| dibenzylurea | 75 | 15.2 | 1.4 | 3505 | 515 | 1240 | 260 | 680 | 605 |
| carbanilide | 75 | 13.7 | 0.31 | 2450 | 495 | 500 | 315 | 515 | 340 |
| none | — | — | 0.007 | 650 | 250 | 385 | 305 | 310 | 310 |

[1]ASTM 1238-70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.

EXAMPLE 4 — FLOW AND TENSILE PROPERTIES OF A SULFONATED EPDM GUM PLASTICIZED WITH SOME SUBSTITUTED UREAS AT DIFFERENT CONCENTRATIONS

Samples of neutralized sulfonated EPDM prepared as in Example 1 were plasticized with various levels of octadecylurea and dibenzylurea in the Brabender Plasticorder described in Example 2. The two octadecylurea samples were prepared in the manner described in Example 2, except of course, one of the mixes contained the lower 30 meq./100g level of octadecylurea. The dibenzylurea samples were prepared by a slightly different procedure. For the lowest level of dibenzylurea, 37g of the non-plasticized gum described in Example 1 was added to the mixing head, and then 0.9g of the additive was added. A mixing speed of 50 RPM was used for almost all of the mixing in the Brabender mixing head. In the case of the dibenzylurea additive, mixing was started at 160° C., but because of its higher melting point, temperatures of up to 177° C. were used during the mixing procedure. About 3 minutes after adding the dibenzlurea the material was mixing well and was well homogenized. At this point a small sample of about 6g was removed from the melt through the gate of the mixing head. Then an additional 1.88g of the dibenzlurea was added, and additional non-plasticized sulfonated EPDM gum was added to fill the mixing head. This material was mixed until it was mixing well, and the torque reading had stabilized; a total of about three minutes, and then a second sample of about 6g was taken. Calculations of wt. percent additive for this sample took into consideration the sample previously removed, as well as the additional additive and non-plasticized gum added after the earlier sample was taken. After the second sample was removed and weighed, an additional 5.25g of the dibenzlurea was added and also additional non-plasticized gum to adequately fill the Brabender mixing head so that the gate was just barely bouncing. The amount of non-plasticized gum needed was determined by running the mixing head for a short time (roughly 15 seconds) and observing whether the gate was bouncing slightly — indicating a filled mixing head. After about three minutes mixing at this highest concentration of additive, the mixing torque had stabilized, the sample was well homogenized, and the full sample was removed from the mixing head and sheeted out with a single pass through a 100° C. two-roll mill having a roll separation of about 0.04 inches.

The concentrations of dibenzylurea were 2.4, 5.8 and 15.2 wt.%. Satisfactory mixing was achieved at all concentrations, though the melt was considerably tougher at the lowest concentration. Tensile properties and melt flow rates at 190° C. are shown in Table II, along with the non-plasticized sulfonated gum for reference.

This example shows that as the concentration of additive is increased for these plasticizers, there is a dramatic increase in the melt flow rate. The higher flow rates are very desirable for rapid fabrication techniques, such as the high speed extrusion of articles, and for fast cycle times and adequate mold filling injection molding operations. The higher melt flow rates resulting from the high concentrations of additives also result in correspondingly greater melt flow rates in compounds made from these gums — such as, for example, compounds with oil and fillers, or blends with plastics. Thus, a substantial gain in processability of compounds is achieved through the use of high concentrations of these plasticizers, in the same way as a substantial gain in processability of the gums was illustrated in these samples.

For the dibenzylurea additive of this example, large increases in melt flow rate are observed in Table II as the concentration increases from 2.4 to 15.2 wt.%. While the melt flow rate is increasing so greatly with increases in concentration, we see that the tensile strength at the highest concentration of over 15 wt.% is above 3500 psi which is an extremely good tensile strength, and more than 5 times that of the unplasticized sulfonated EPDM gum. This tensile strength is considerably greater than the tensile strength at 5.8 wt.% additive — about 50% more. This result is quite surprising in view of the prior art which teaches that tensile properties deteriorate as additive concentrations increase past 6 wt.%. Indeed, there was a substantial decrease in tensile strength for the dibenzlurea additive in going from 2.4 to 5.8 wt.% in agreement with the exceptions of prior art; however, as concentration is increased to 15 wt.% additive, a tensile strength even superior to that at the lower concentrations is obtained. Therefore, it is seen that concentrations of above 5 parts per hundred wt.% can result in particularly excellent room temperature tensile strength and outstanding melt flow rates at processing temperatures (e.g., excellent processability), for a resultant very excellent balance of tensile properties and melt processability.

For the concentrations of octadecylurea given in Table II there is more than a 250% increase in melt flow rate as a result of going from 7.8 to 15.7 wt.% of additive; and there is a change in tensile strength of less than 20%. Since the higher concentration of octadecylurea results in only slightly reduced and still quite satisfactory tensile strength while causing a very substantial increase in melt flow, the overall property/rheology balance of the material is markedly increased.

injection molding where high melt flow rates would be at a premium, but the fabricated articles shouldn't require outstanding tensile strength; for example, some possible applications are shock absorbers or rubber protective mats.

Table II

PROPERTIES OF A SULFONATED EPDM GUM[4] PLASTICIZED WITH SOME SUBSTITUTED UREAS AT DIFFERENT CONCENTRATIONS

| Additive | Concentration (meq/100g) | Wt.% | Melt Flow Rate[1] (g/10 min) | Tensile Properties[2] (Room Temperature) | | |
|---|---|---|---|---|---|---|
| | | | | Strength (psi) | Elong. (%) | Initial Modulus[3] (psi) |
| Octadecylurea | 30 | 7.8 | 0.41 | 2355 | 520 | 520 |
| Octadecylurea | 60 | 15.7 | 1.5 | 1950 | 505 | 645 |
| Dibenzylurea | 10.2 | 2.4 | 0.09 | 3175 | 475 | 655 |
| Dibenzylurea | 25.6 | 5.8 | 0.5 | 2360 | 455 | 735 |
| Dibenzylurea | 74.6 | 15.2 | 1.4 | 3505 | 515 | 1240 |
| None | — | — | 0.007 | 650 | 250 | 385 |

[1]ASTM 1238-70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.
[4]The nonplasticized gum is the material described in Example 1; (Zinc acetate neutralized, 32 meq. of sulfonation per 100g of gum).

EXAMPLE 5 — PHYSICAL PROPERTIES OF A SULFONATED EPDM PLASTICIZED WITH VARIOUS SUBSTITUTED THIOUREAS AT HIGH CONCENTRATION

Various substituted ureas were incorporated into samples of the neutralized sulfonated EPDM described in Example 1, using procedures similar to those described in Example 2. Excellent homogeneity was obtained in each of the plasticized materials. Test samples were prepared and room temperature tensile measurements were made using the procedures described in Example 3. Melt flow rate measurements were also made using the technique described in Example 3. The melt flow rates and tensile properties for the sulfonated EPDM samples plasticized with various substituted thioureas at high concentrations are shown in Table III.

This example shows that the melt flow rates for these gums plasticized with various thioureas are excellent. The melt flow rates of the materials in Table III are roughly 200 times greater than that of the non-plasticized gum into which they were incorporated. The tensile properties of the gums plasticized with various substituted thioureas are comparable to, or somewhat greater than that of the non-plasticized gum. However, the tensile strengths are not as outstanding as for some of the substituted ureas listed in Table I. Therefore, preferred applications for sulfonated elastomers plasticized with these particular substituted thioureas would involve high rates of fabrication such as extrusion or

TABLE III

TENSILE AND MELT FLOW PROPERTIES OF A SULFONATED EPDM PLASICIZED WITH VARIOUS THIOUREAS AT HIGH CONCENTRATION

| Additive | Concentration (meq/100g) | Wt. % | Melt Flow Rate[1] (g/10 min) | Tensile Properties[2] (Room Temperature) | | |
|---|---|---|---|---|---|---|
| | | | | Strength (psi) | Elong. (%) | Initial Modulus[3] (psi) |
| 1,3 didodecyl-2-thiourea | 60 | 19.8 | 1.3 | 1155 | 670 | 420 |
| N,N'di-P-tolylthiourea | 60 | 13.3 | 1.9 | 1025 | 590 | 390 |
| Thiocarbanilide | 67 | 13.3 | 1.6 | 580 | 685 | 360 |
| None | — | — | 0.007 | 650 | 250 | 385 |

[1]ASTM 2138-70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.

EXAMPLE 6 — COMPARISON OF PROPERTIES OF SULFONATED EPDM GUMS PLASTICIZED WITH HIGH CONCENTRATIONS OF VARIOUS FUNCTIONAL TYPES HAVING LONG ALKYL CHAINS

Samples of the non-plasticized gum described in Example 1 were mixed with high concentrations of additives having various different functional groups. Each of these additives contained a long alkyl chain to insure reasonably good compatibility with the gum at processing temperatures. The functional groups in Table IV include urea, ester, ketone, phthalate, alcohol and nitrile, as well as a $C_{18}$ wax for reference. Each material was incorporated in the non-plasticized lightly sulfonated EPDM prepared in Example 1, at a concentration of 60 meq. per 100g of gum. The procedure described in Example 2 was used for incorporating the additives into the non-plasticized gum. The mixes which resulted in very low melt flow rate compositions (see Table IV) were difficult to mix and required longer times (perhaps 10 minutes or slightly longer) in the Brabender mixer. Also, these low melt flow rate compositions tended to mix as chunks rather than forming a coherent sheet or melt within the mixer. For example, the nitrile and ketone plasticized samples were particularly difficult to mix. However, it appeared that adequate dispersion of the additive in each of the samples was accomplished, and the material removed from the mixer appeared to be uniform in all cases. Melt flow rates and tensile measurements were made on each of the samples using the procedures described in Example 3. The results are shown in Table IV.

The six additives with functional groups shown here all have dipole moments well above 0.6 Debyes, so the prior art does not distinguish between which will be the more effective additives; yet, when used at identical molar concentrations, there is a difference of about a factor of 75 between the poorest and the best flow improver here.

These results show that numerous organic chemicals having high dipole moments are relatively poor as melt flow improvers when used at high concentration in sulfonated EPDM. The substituted ureas and thioureas are very effective melt flow improvers for sulfonated EPDM when used at high concentrations, and their excellent effectiveness as compared with many other functional additives could not be anticipated from the prior art.

TABLE IV

COMPARISON OF VARIOUS FUNCTIONAL TYPES HAVING LONG ALKYL CHAINS AS ADDITIVES TO A ZINC NEUTRALIZED SULFONATED EPDM

| Additive | Concentration (meq/100g gum) | wt. % | Melt Flow Rate[1] (g/10 min) | Tensile Properties[2] (Room Temperature) | | |
|---|---|---|---|---|---|---|
| | | | | Strength (psi) | Elong. (%) | Initial Modulus[3] (psi) |
| Octadecylurea | 60 | 15.7 | 1.5 | 1950 | 505 | 645 |
| Butylstearate | 60 | 17.0 | 0.10 | 670 | 480 | 300 |
| 6-undecanone | 60 | 9.3 | 0.02 | 620 | 310 | 395 |
| Didodecyl phthalate | 60 | 23.1 | 0.15 | 555 | 425 | 265 |
| Octadecylalcohol | 60 | 13.9 | 0.36 | 1300 | 490 | 475 |
| Stearonitrile | 60 | 13.7 | 0.15 | 770 | 495 | 370 |
| Octadecane | 60 | 13.3 | 0.19 | 720 | 410 | 375 |
| None | — | — | 0.007 | 650 | 250 | 385 |

[1]ASTM 1238–70, Standard Capillary, 190° C, 250 psi.
[2]Microdumbbell, about 22 mils thick, 0.1 inch wide, 0.5 inch long straight test region. Pulled at 2 inches/minute.
[3]Modulus determined from initial steepest slope of the stress-strain curve.

Since many modifications and variations of this invention may be made without departing from the spirit or scope of the invention thereof, it is not intended to limit the spirit or scope thereof to the specific examples thereof.

What is claimed is:

1. An elastomeric composition including:
   (a) 100 parts by weight of a neutralized sulfonated elastomeric polymer having at least about 15 meq. neutralized sulfonate groups per 100 grams of said sulfonated elastomeric polymer, said neutralized sulfonate groups being neutralized with metal cations, ammonium ion or amine; and
   (b) at least about 5 parts by weight of an organic urea or thiourea having the formula

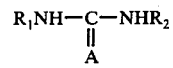

based on 100 parts of said neutralized sulfonated elastomeric polymer, wherein A is selected from the group consisting of oxygen and sulfur and $R_1$ and $R_2$ are independently selected from the group consisting of alkyl groups, aralkyl groups, and aryl groups, and wherein if $R_1$ and $R_2$ are alkyl groups, then at least one of them must be a $C_{12}$ to $C_{22}$ alkyl.

2. A composition according to claim 1, wherein said neutralized sulfonated elastomeric polymer is formed from an elastomeric polymer selected from the group consisting essentially of Butyl rubber and an EPDM terpolymer.

3. A composition according to claim 2, wherein said EPDM terpolymer consists essentially of about 40 to about 80 wt.% of ethylene, of about 10 to about 53 wt.% of propylene and of about 1 to about 10 wt.% of a non-conjugated diene.

4. A composition according to claim 3, wherein said non-conjugated diene is selected from the group consisting essentially of 1,4-hexadiene, dicyclopentadiene, alkylidene substituted norbornenes, alkenyl substituted norbornenes and tetrahydroindene.

5. A composition according to claim 4, wherein said non-conjugated diene is 5-ethylidene-2-norbornene.

6. A composition according to claim 1, wherein said metal cation of said metal neutralized sulfonated polymer is selected from the group consisting essentially of Groups I-A, II-A, I-B and II-B, lead, antimony and iron of the Periodic Table of Elements.

7. A composition according to claim 1, wherein said urea is dibenzylurea.

8. A composition according to claim 1, containing at least 8 parts by weight of said urea or thiourea.

9. A composition according to claim 1, wherein said organic urea or thiourea has a melting point of at least about 70° C.

10. A composition according to claim 1, wherein said metal cation is zinc.

* * * * *